(12) United States Patent
Van Groenigen

(10) Patent No.: US 8,770,101 B2
(45) Date of Patent: Jul. 8, 2014

(54) METHOD FOR CONTROLLING A TWINE BRAKE DEVICE OF A SQUARE BALER

(75) Inventor: Jan C. Van Groenigen, Varsenare (BE)

(73) Assignee: CNH Industrial America LLC, New Holland, PA (US)

( * ) Notice: Subject to any disclaimer, the term of this patent is extended or adjusted under 35 U.S.C. 154(b) by 284 days.

(21) Appl. No.: 13/322,126

(22) PCT Filed: May 26, 2010

(86) PCT No.: PCT/EP2010/057271
§ 371 (c)(1),
(2), (4) Date: Feb. 10, 2012

(87) PCT Pub. No.: WO2010/136501
PCT Pub. Date: Dec. 2, 2010

(65) Prior Publication Data
US 2012/0137901 A1    Jun. 7, 2012

(30) Foreign Application Priority Data

May 27, 2009  (BE) .................................. 2009/0326

(51) Int. Cl.
*A01F 15/12*    (2006.01)
*B65B 13/22*    (2006.01)
*B65B 13/26*    (2006.01)
*A01F 15/08*    (2006.01)

(52) U.S. Cl.
CPC .............. *A01F 15/12* (2013.01); *A01F 15/0825* (2013.01)
USPC ...................................... 100/2; 100/4; 100/29

(58) Field of Classification Search
USPC ........ 100/2, 3, 4, 7, 8, 17, 19 R, 24, 19 A, 29, 100/32, 33 R
See application file for complete search history.

(56) References Cited

U.S. PATENT DOCUMENTS

| | | | | |
|---|---|---|---|---|
| 3,080,811 | A * | 3/1963 | Freudling et al. .................. | 100/2 |
| 3,400,959 | A * | 9/1968 | Grillot .............................. | 289/2 |
| 3,498,213 | A * | 3/1970 | Shepley ...................... | 100/19 R |
| 4,074,623 | A * | 2/1978 | White ............................... | 100/3 |
| 7,296,828 | B2 * | 11/2007 | Schoonheere et al. ............. | 289/2 |
| 2006/0012176 | A1 * | 1/2006 | Schoonheere et al. ............. | 289/2 |
| 2009/0179102 | A1 * | 7/2009 | Naaktgeboren et al. ... | 242/419.5 |

FOREIGN PATENT DOCUMENTS

| | | |
|---|---|---|
| DE | 270283 C | 2/1914 |
| DE | 282837 A5 | 9/1990 |
| DE | 4433587 A1 | 3/1996 |
| EP | 0857414 A1 | 8/1998 |

* cited by examiner

*Primary Examiner* — Jimmy T Nguyen
(74) *Attorney, Agent, or Firm* — Patrick M. Sehldrake

(57) ABSTRACT

A twine brake device is so controlled that during an initial period in which the bale chamber is not filled with harvested material, the average tension in the twine, wire or cord is higher than during a second period in which the bale chamber is completely filled with harvested material.

11 Claims, 3 Drawing Sheets

METHOD FOR CONTROLLING A TWINE BRAKE DEVICE OF A SQUARE BALER

This application is the US National Stage filing of International Application Ser. No. PCT/EP2010/057271 filed on May 26, 2010 which claims priority to Belgium Application BE2009/0326 filed May 27, 2009, each of which is incorporated herein by reference in its entirety.

TECHNICAL FIELD

The present invention relates to a method for controlling a twine brake device of a rectangular baler, in particular in forming a bale when the bale chamber is not completely filled with harvested material.

BACKGROUND ART

A known rectangular baler comprises a bale chamber, an oscillating piston in the bale chamber, twine, wire or cord to be wrapped around the formed bale, a knotter device for tying the twine, wire or cord, a twine brake device for setting the tension in the twine.

It is a known problem that at the start of the pressing of bales with a rectangular baler of which the bale chamber is empty there is first produced a bale whose density is insufficient. This situation occurs for example to a contractor at the start of the formation of bales on a field of a new customer after the bale chamber was emptied after finishing a field from a previous customer. This problem arises because no or insufficient crop material is present in the bale chamber to deliver sufficient counterpressure. The operator must interrupt his work after forming and ejecting the first bale, cut the twines of the first bale and process the crop a second time with the baler. This is uncomfortable and time consuming.

It is also known from for example DE4433587 to introduce an additional element in the bale chamber to generate sufficient counter pressure to the harvested material that is introduced into the empty bale chamber. These elements are impractical, time consuming and subject to wear in case of eg the inflatable body or requires a strong drive and large adjustments to the bale chamber and is extensive in the case of the rotating arms.

DISCLOSURE OF INVENTION

The present invention aims to provide an answer to the above drawbacks by providing a method and a baler according to the invention with minimal modifications to an existing baler enables to produce a bale with an acceptable density even if the bale chamber is not yet completely filled with harvested material.

According to a first aspect of the present invention there is provided a method for controlling a twine brake device of a rectangular baler, characterized in that the twine brake device is controlled so that during a first period in which the bale chamber is not completely filled with harvested material, the average tension in the twine, wire or cord is greater than during a second period in which the bale chamber is completely filled with harvested material.

This offers the advantage that sufficient pressure can be generated by the twines already present in the bale chamber. In this way it is possible in a simple way and with minimal changes to a known baler to still produce a bale with an acceptable density even if the bale chamber is not completely filled with harvested material.

According to an embodiment of the invention the first period starts at the start of the formation of the first bale in an empty bale chamber.

This offers the advantage that the moment in which the twine tension is increased can be determined in a simple manner. This is particularly advantageous in a manually activatable system. The operator then turns it on when he starts forming bales with an empty bale chamber.

According to another embodiment of the invention the first period starts after the formation of a predetermined length of compressed harvested material in an empty baling chamber.

This offers the advantage that the increased string tension is applied only when enough crop material was introduced into the empty bale chamber so that the increased risk for throwing back harvested material in the pre-compression chamber is avoided. The length of the compressed crop material can easily be determined using a known bale length sensor of the baler.

According to another embodiment of the invention the first period starts after the introduction of a predetermined amount of harvested material into an empty bale chamber.

This also offers the advantage that the increased twine tension is applied only when enough crop material was introduced into the empty chamber such that the increased risk for throwing back harvested material in the pre-compression chamber is avoided. The amount of harvested material can easily be deduced from the number of slices of harvested material that were introduced from the pre-compression chamber into the empty bale chamber.

According to another embodiment of the invention the first period stops at the tying off of the first bale formed in an empty bale chamber.

This offers the advantage that the knotting process is not or almost not affected by the increased tension in the twines. Moreover, it offers an easy determination of an end point which is beneficial to a system which has to be activated or deactivated manually on the basis of on for example a mechanical coupling to the knotting mechanism.

According to another embodiment of the invention the first period stops after the introduction of a predetermined length of compressed harvested material in an empty bale chamber.

According to another embodiment of the invention the first period stops after introducing a predetermined quantity of harvested material into an empty bale chamber.

According to a second aspect of the invention there is provided a rectangular baler to perform the method according to the first aspect of the invention, comprising:

A bale chamber;
One plunger oscillating in the bale chamber;
At least one twine, wire or cord for wrapping around the formed bale;
A knotter device for knotting the twine, wire or cord;
At least one controllable twine brake device to increase the tension in at least one twine, wire or cord; and
A controller for controlling the at least one controllable twine brake device.

This offers the advantage that without adding significant elements sufficient pressure can be generated by the twines already present in the bale chamber.

According to an embodiment of the invention the controllable twine brake device comprises a drive which is executed as a cam drive, excenter drive, electric drive or hydraulic drive.

According to an embodiment of the invention the rectangular baler comprises at least two controllable twine brake devices and the at least two controllable twine brake devices are driven by a common drive.

This offers the advantage that only one drive is necessary to drive multiple twine brake devices.

According to an embodiment of the invention, the knotter device is a double knotter device; the twine, wire or cord to be wrapped around the formed bale is formed with a top twine, wire or string and a lower twine, wire or cord; and the rectangular baler comprises at least two controllable twine brake devices, one for increasing the tension in the upper twine, wire or cord, and one for increasing tension in the lower twine, wire or cord.

This enables application of the method according to the invention to a double knotter device in an simple way.

BRIEF DESCRIPTION OF DRAWINGS

The invention will now be further described, by way of example, with reference to the accompanying drawings, wherein.

MODE(S) FOR CARRYING OUT THE INVENTION

The terms "front", "rear", "forward", "rearward", "left" and "right" as used in this description are defined relative to the normal direction of movement of the baler during its operation.

Figure 1:
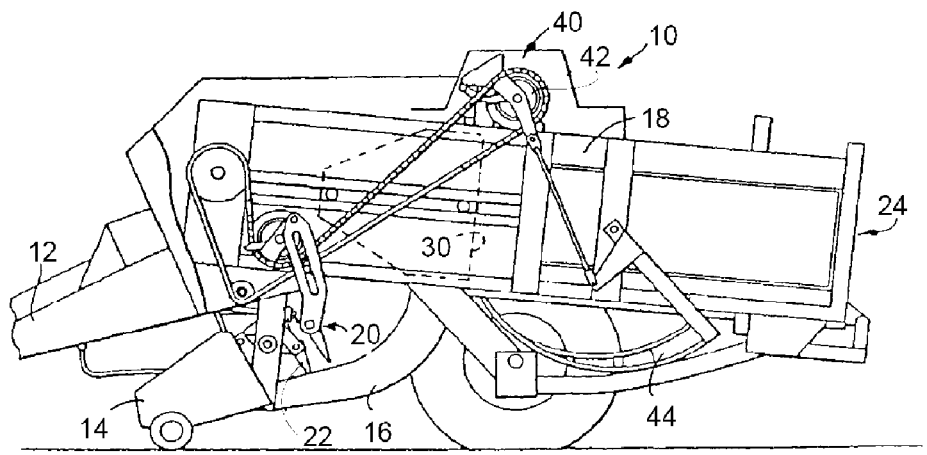
FIG. 1 is a schematic representation of one side of a rectangular baler according to the invention.

FIG. 1 is a schematic representation of a rectangular baler 10 is equipped with a forward extending rod 12 with coupling means not shown to link the baler 10 to a tractor not shown. A pickup 14 picks up the harvested material that lies in a swath on the field when the baler 10 rides over it and delivers this harvested material to the entrance of an upwardly and backwardly curved pre-compression chamber 16. This pre-compression chamber 16 is at its upper end connected to a bale chamber 18 that extends above it from the front to the rear. The bale chamber 18 is slightly inclined towards the horizontal, being lower on the back than in front. At the bottom of the pre-compression chamber 16, the crop coming from the pickup 14 is fed by a packer 22 in the pre-compression chamber 16 until the pre-compression chamber 16 is filled with a desired density, thus forming a slice. According to an alternative not shown, it is also possible, for example to omit the packer 22 or to substitute a packer 22 with a chopper for example. The upper wall of the pre-compression chamber has slots that can be penetrated by the tines of a fork 20, which is part of the loading mechanism more fully described in EP0636308 for example. When a slice was formed in the pre-compression chamber 16, there is started in synchronism with the movement of the plunger 30 a loading cycle during which the tines 20 penetrate the pre-compression chamber 16. During the remainder of the loading cycle the slice is moved up into the bale chamber 18, where the plunger 30 that reciprocates in the bale chamber 18 compresses the slices further to form a bale that is moved gradually to the rear discharge opening 24 of the bale chamber 18 by the plunger 30.

As already known the baler comprises also a mechanism for wrapping the bales and sometimes individual slices inside the bale with a length of twine and a knotter device 40 for forming knots in the twine. The knotter device 40 can comprise a series of periodically activated needles 44 that are normally stationed under the bale chamber 18, but that swing upward through the bale chamber 18 as they are triggered to present twine to a corresponding series of knotters 42 which are positioned above the baling chamber 18 and are distributed across the width thereof. The number of needles 44 and corresponding knotters depends on the transverse width of the bale chamber. A typical large rectangular baler can comprise 4 to 6 needles 44 and knotters 42 for putting 4 to 6 parallel loops of string around the bale.

The known tying devices for square balers can be divided into two large groups. I concerns single knot devices as shown schematically in FIG. 2 and for example known from and described in more detail in EP0392627 and double knot devices as shown schematically in FIG. 3 and for example known from and described in greater detail in U.S. Pat. No. 4,142,746.

Figure 2:
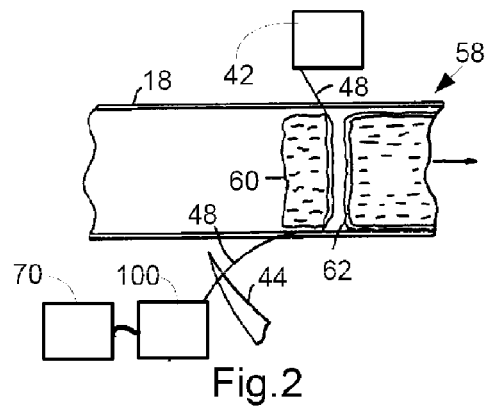
FIG. 2 is a schematic representation of a single knotter device of a rectangular baler according to the invention.

For some knotter devices as shown in FIG. 2, the twine 48 is taken from a twine supply 70 and guided via a twine brake device 100 and the needle 44 through the bale chamber 18 between the harvested material of a bale 60 being formed, and an already completed bale 58 to a knotter 42 that in this case also comprises a twine clamp. As new crop material is introduced into the bale chamber 18 the already completed bale 58 and the bale 60 being formed move in the direction of the arrow and there is drawn new twine from the twine stock 70, as the twine 48 is clamped at its end in the knotter 42. The twine 48 is held at the desired tension by means of a twine brake device 100. When the bale 60 being formed has reached a predetermined length the knotter device 40 is activated to wrap the twine around the bale and to tie it. One end of the twine 48 remains clamped in the knotter 42 to form the next bale.

Figure 3:
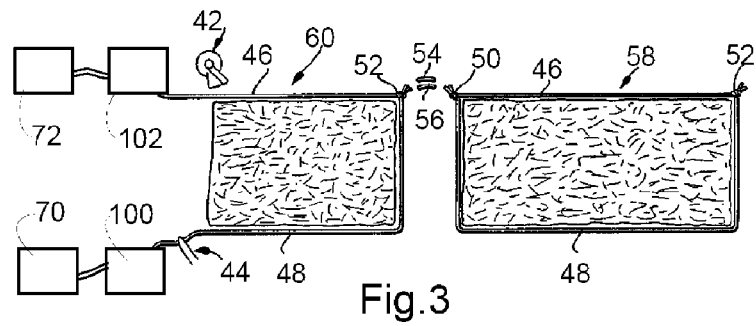
FIG. 3 is a schematic representation of a double knotter device of a rectangular baler according to the invention.

With double knot devices as shown in FIG. 3, the loop around the already completed bale 58 is formed by a top twine 46 and a bottom twine 48 that are linked by means of two knots 50, 52. The bottom twine 48 is taken from a twine supply 70 and guided via a twine brake device 100 and the needle 44 through the bale chamber between the harvested material of a bale 60 being formed and an already completed bale 58 to the upper string 48, with which it is linked by means of a knot 52. This top twine 46 is taken from a twine supply 72 and guided via a twine brake device 102 to the bottom twine 48. When new crop material is introduced into the bale chamber 18 the already completed bale 58 and the bale 60 being formed move towards the discharge opening 24 and there is taken up new twine from the respective twine supplies 70 and 72 for the bottom twine 48 and the top twine 46. It is clear that two twine brake devices 100 and 102 are necessary for both the upper twine 46 and the lower twine 48 to maintain the desired tension. When the bale 60 being formed has reached a predetermined length the knotter device 40 is activated to wrap the lower twine 48 around the bale and tying it to the top twine 46 by means of a first knot 50. There is subsequently formed a second knot 52 between the upper twine 46 and the lower twine 48 to wrap the next bale. The twine ends 54 and 56 between the first knot 50 and the second knot 52 are typically cut and removed during this process.

Figure 4:
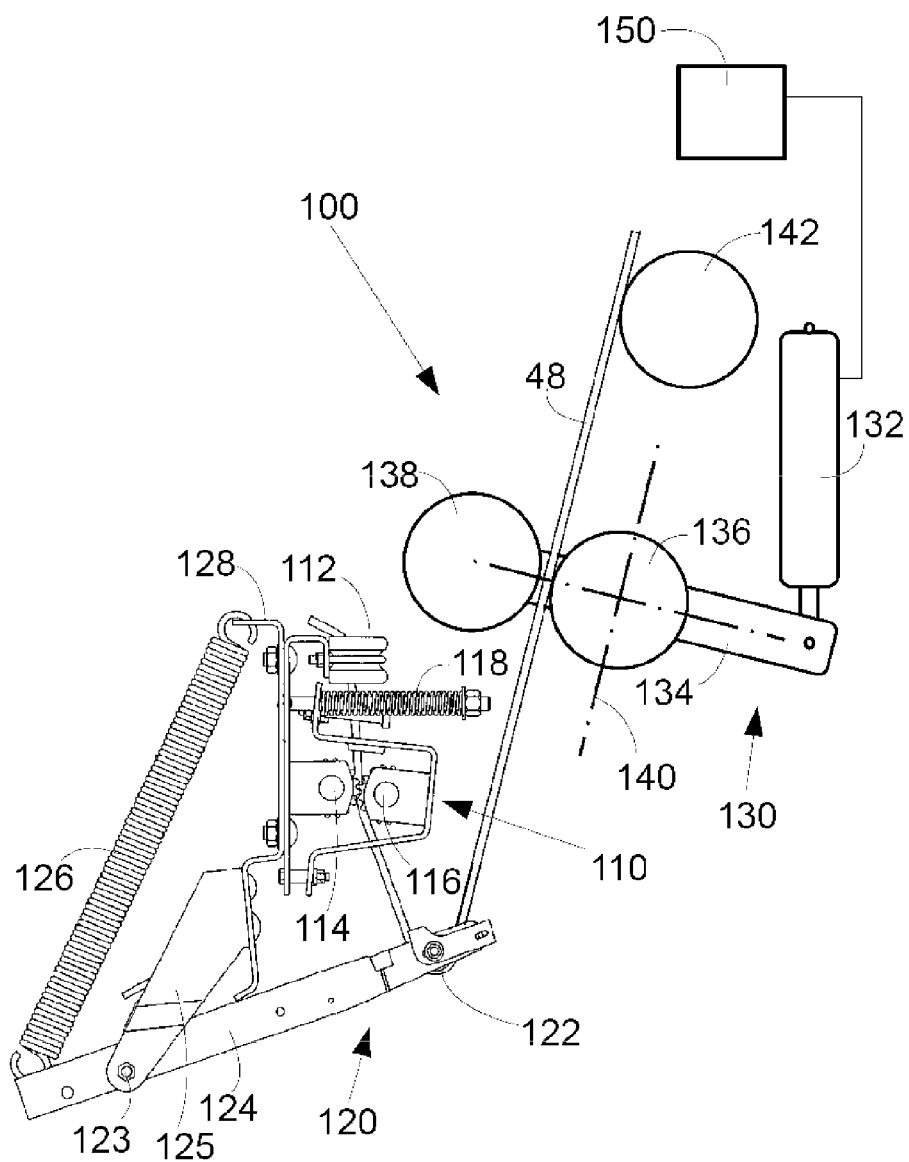
FIG. 4 is a schematic representation of a twine brake device for a rectangular baler according to the invention in a deactivated position.
Figure 5:
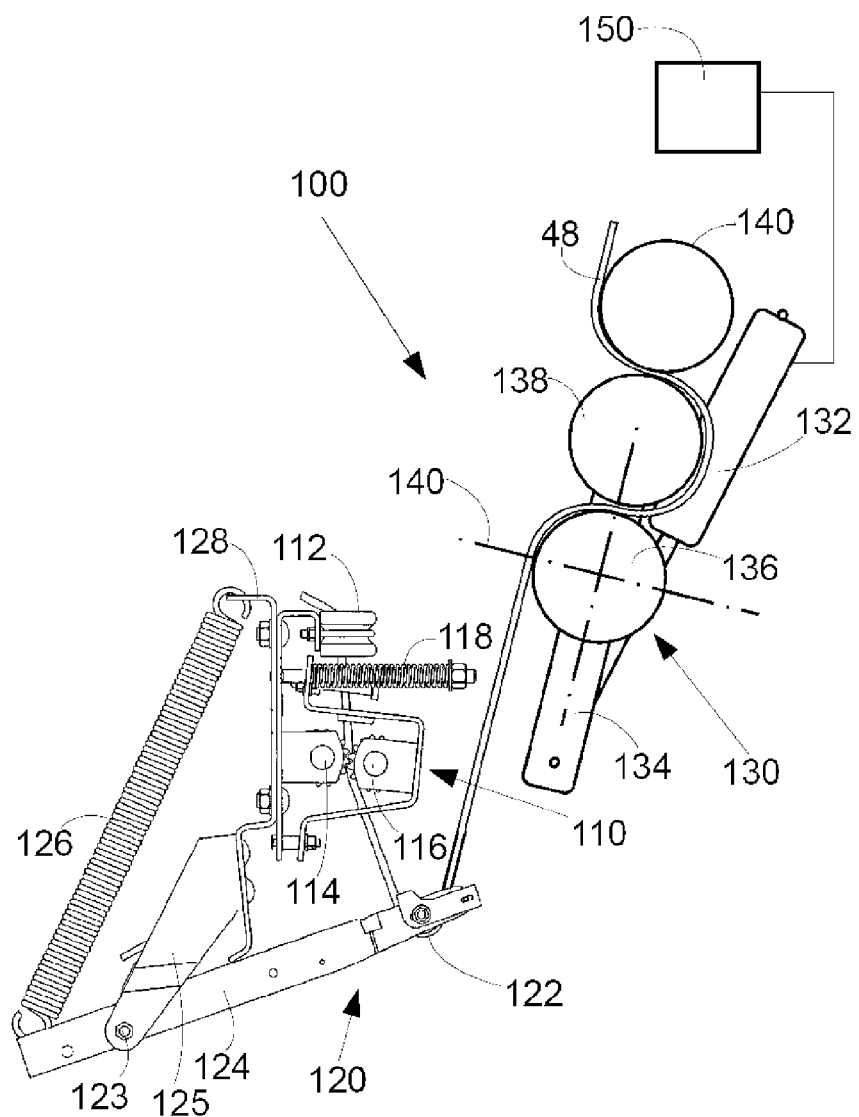
FIG. 5 a schematic view similar to FIG. 4 with the twine brake device in an activated position.

A twine brake device 100 as schematically shown in FIGS. 2 and 3 is shown in more detail in FIGS. 4 and 5. There will be referred to a twine brake device 100 for a single knot device or for the bottom twine 48 of a double knot device. It is clear that a twine brake device 102 for the top twine 46 for a double knot device can be implemented similar. The twine brake device 100 comprises a first twine brake 110, a compensator arm 120 and a second twine brake 130.

The twine 48 from the bottom twine supply 70 is guided to the first twine brake 110 through a twine guide 112. Such a twine brake is for example known from EP0856248 and comprises a pair of opposite, ribbed rollers 114 and 116 that are pressed together by means of a spring 118 to clamp the twine 48. The first twine brake 110 is mounted on a mounting plate 128 which in turn is mounted to the frame of the baler 10.

Subsequently the twine 48 is guided to the compensator arm 120 where the twine is bent around a roller 122 that is attached to an arm 124 that is mounted tiltable about pivot 123 on a mount arm 125 which in turn is mounted to the mounting plate 128. To the arm 124 there is attached a spring 126 that is attached at its end opposite to the mounting plate 128. This allows, as for example known from EP0856246, the compensator arm 120 to take up a certain length of twine, that is for example being released during the knotting process, to maintain the desired tension in the twine 48.

Subsequently the twine 48 is guided to a second twine brake 130. As schematically shown in FIG. 4, the second twine brake comprises three transverse shafts 136, 138 and 142. The twine 48 is guided between the first transverse shaft 136 that is attached to the frame of the baler 10 and a second transverse shaft 138 which is attached to an arm 134 that is tiltably mounted around a rotation axis 140, indicated with a crosshair, to the frame of the baler 10. To tilt the arm 134 around axis of rotation 140 there is mounted to the arm 134 an actuator 132 that is executed as a hydraulic cylinder that is mounted to the frame of the baler 10 at its opposite end. Finally, the twine is guided along a third transverse shaft 142 that similar to the first transverse shaft 136 is mounted on the frame of the baler 10.

The condition of the twine brake device 100 as shown in FIG. 4 is referred to as the deactivated position. Hereby the first twine brake 110 and the compensator arm 120 take care of the desired tension in the twine 42. The second draadrem 130 almost doesn't influence the tension in the twine 42. This is the situation during normal operation of the baler 10, this means when there is enough harvested material present in the bale chamber 18 to generate the required counter pressure.

When the bale chamber 18 is empty or it contains insufficient harvested material to generate the required counter pressure then then according to the method according to the invention the twine brake 100 is controlled so that during this period in which the bale chamber 18 is not completely filled with harvested material, the mean tension in the twine 48 is higher than during the subsequent period in which the bale chamber 18 is completely filled with harvested material. In FIG. 5, the condition of the twine brake device 100 is displayed that is referred to as the activated position to raise the tension in the twine 48 to generate sufficient counter pressure in the twine 48 in a sufficiently filled bale chamber 18. For this purpose the arm 134 is tilted about 90° clockwise around axis of rotation 140 by means of actuator 132. Because of this the second transverse shaft 138 mounted on the arm 134 is aligned with the first transverse shaft 136 and the third transverse shaft 142. This creates a labyrinth for the twine 48 that is bent around the surface of the transverse shafts 136, 138 and 142. Because of this the second brake device 130 exerts an additional braking force on the twine 48 and there is built up on the basis of this additional braking force an increased tension in the twine. This extra tension lies for example in the range of 500N to 1500N, for example 750N. Based on experiments there was found that an additional tension of 750N in the twines led to an increase in the density of the first bale produced in an empty bale chamber 18 from 20% to 40%. A bale of such an increased density was in most cases of an acceptable quality and should not be cut open to be processed again by the baler 10.

According to an embodiment of the invention the twine brake device 100 is activated when you start forming the first bale in an empty bale chamber and the twine brake device 100 is deactivated by the tying off of the first bale in an empty bale chamber. This offers the advantage that the moment when the twine tension is increased is readily identifiable. This is especially beneficial in a manually activated system. The operator turns it on when he starts forming bales with an empty bale chamber. Also, the knotting process is not or hardly influenced by the increased tension in the twines. Moreover, it offers an endpoint that can be determine in a simple way which is advantageous to a system that must be deactivated manually or is deactivated on the basis of for example mechanical coupling to the knotter mechanism.

According to another embodiment of the invention, the twine brake device 100 is activated after the formation of a first predetermined length of compressed crop material into an empty bale chamber 18 and the twine brake device 100 is deactivated after the introduction of a second predetermined length of compressed crop material into an empty bale chamber 18. This offers the advantage that the increased twine tension is applied only when enough crop material was introduced into the empty bale chamber 18 so that the increased risk for throwing back crop material by the twines 48 into the pre-compression chamber 16 is avoided. The length of the compressed crop material can easily be determined using a known bale length sensor of the baler 10 or on the basis of a sensor for the length of the twine 48 taken off, such as for example known from EP0856248. The predetermined lengths of compressed crop material whereby the twine brake device 100 is activated and deactivated, can for example be inputted in advance by the operator into the controller 150 of the baler which will then in turn control the twine brake device 100 in a suitable way.

According to another embodiment of the invention, the twine brake device 100 is activated after the introduction of a first predetermined amount of crop material into an empty bale chamber 18 and the twine brake device 100 is deactivated after introducing a predetermined amount of crop material into an empty bale chamber 18. This also offers the advantage that the increased twine tension is applied only when enough crop material was introduced into the empty bale chamber 18 so that the increased risk for throwing back harvested material in the pre-compression chamber 16 is avoided. The amount of harvested material that was introduced into the bale chamber 18 can easily be derived, for example, from the number of slices of harvested material that were introduced from the pre-compression chamber into the empty bale chamber.

It is clear that any combination of the above options to activate and deactivate the twine brake 100 is possible.

It is clear that in order to carry out the method according to the invention the tension in at least one twine must be increased by at least one twine brake 100. The activation and deactivation of the twine brake 100 can be done manually or by using a control unit 150 of the baler 10. In order to generate enough counter pressure, it is advantageous to increase the tension present in all available twines in the bale chamber in the case of an insufficiently filled bale chamber 18.

According to an embodiment not shown, the actuator 132 of the twine brake 100, which is shown in FIGS. 4 and 5 as a hydraulic drive, can also be implemented as a cam drive, excenter drive, electric drive or another appropriate drive.

According to another embodiment of the invention the transverse shafts 136, 138 and 142, or at least the second transverse shaft by 138 extend over almost the entire width of the baler 10. The third braking device 130 of multiple twine brake devices 100 can be controlled through a single common actuator 132. This offers the advantage that only one drive is necessary to drive multiple twine brake devices 100.

It is clear that to perform the method according to the invention in a double knotter device two controllable twine brake devices 100, 102, one for increasing the tension in the upper twine 46 and one for increasing the tension in the lower twine 48 are necessary. Both twine brake devices 100, 102 may be implemented similarly as the twine brake device 100 shown in FIGS. 4 and 5 and can, for example, be activated and deactivated together by the controller 150 of the baler.

With the twine brake device 100 shown in FIGS. 4 and 5 it is advantageous to choose the diameters of the transverse shafts 136, 138 and 142 sufficiently large so that the twine is not suddenly bent as this could cause breakage when an increased tension in the twine 48 is applied.

According to embodiments not shown, it is also possible to implement the method according to the invention with alternative embodiments of the twine brake device 100, 102. It is for example possible to implement the twine brake device 100 with just one twine brake and a compensator arm. This twine brake then supplies the increased tension and also ensures the regular tension in the twine when the bale chamber is filled sufficiently with harvest material. It is clear that the thread brake device 100 can be implemented as any other suitable thread brake, such as for example controllable disc brakes or other known brake devices from DD282837, DD280303, DE1103067 and U.S. Pat. No. 6,634,284.

The invention as defined in the claims is obviously not limited to the exemplary embodiments described and shown in the drawings, but may also include combinations and variations that fall within the scope of the claims.

I claim:

1. A method for controlling a twine brake device of a rectangular baler comprising:
    controlling the twine brake device during a first period in which the bale chamber is not completely filled with harvested material such that the average tension in the twine, wire or cord is greater than during a second period in which the bale chamber is completely filled with harvested material; and
    wherein the controllable twine brake device comprises first and second twine brakes, the second twine brake cooperating with the first twine brake to exert an additional braking force on the twine, wire or cord when the bale chamber is not completely filled with harvested material and to build up on the basis of this additional braking force an increased tension in the twine wire or cord.

2. A method according to claim 1, wherein the first period starts at the start of the formation of the first bale in an empty bale chamber.

3. A method according to claim 1, wherein the first period starts after the formation of a predetermined length of compressed harvested material in an empty bale chamber.

4. A method according to claim 1, wherein the first period starts after the introduction of a predetermined amount of harvested material into an empty bale chamber.

5. A method according to claim 1, wherein the first period stops at the tying off of the first bale formed in an empty bale chamber.

6. A method according to claim 1, wherein the first period stops after the introduction of a predetermined length of compressed harvested material into an empty bale chamber.

7. A method according to claim 1, wherein the first period stops after the introduction of a predetermined amount of harvested material into an empty bale chamber.

8. A rectangular baler, comprising:
    a bale chamber;
    one plunger oscillating in the bale chamber;
    a knotter device for knotting twine, wire or cord;
    at least one controllable twine brake device comprising a first twine brake to increase the tension in at least one twine, wire or cord; and
    a controller programmed to control the twine brake device in a first period in which the bale chamber is not completely filled with harvested material such that the average tension in the twine, wire or cord is greater than during a second period in which the bale chamber is completely filled with harvested material; and
    wherein the controllable twine brake device further comprises a second twine brake device, the second twine brake device cooperating with the first twine brake to exert an additional braking force on the twine, wire or cord when the bale chamber is not completely filled with harvested material and to build up on the basis of this additional braking force an increased tension in the twine wire or cord.

9. A rectangular baler according to claim 8, wherein the controllable twine brake device comprises a drive which is executed as a cam drive, excenter drive, electric drive or hydraulic drive.

10. A rectangular baler, comprising:
    a bale chamber;
    one plunger oscillating in the bale chamber;
    a knotter device for knotting twine, wire or cord;
    at least one controllable twine brake device to increase the tension in at least one twine, wire or cord; and
    a controller programmed to control the twine brake device in a first period in which the bale chamber is not completely filled with harvested material such that the average tension in the twine, wire or cord is greater than during a second period in which the bale chamber is completely filled with harvested material;
        wherein the controllable twine brake device comprises a drive which is executed as a cam drive, excenter drive, electric drive or hydraulic drive; and
        wherein the rectangular baler comprises at least two controllable twine brake devices and the at least two controllable twine brake devices are driven by a common drive.

11. A rectangular baler according to claim 9, wherein
    the knotter device is a double knotter device;
    the twine, wire or cord to be wrapped around the formed bale is formed with a top twine, wire or cord and a lower twine, wire, cord, and
    the rectangular baler further comprises at least two controllable twine brake devices, one twine brake device for increasing the tension in the upper twine, wire or cord and one twine brake device for increasing the tension in the lower twine, wire or cord.

* * * * *